United States Patent [19]

Nagano

[11] Patent Number: 4,781,657

[45] Date of Patent: Nov. 1, 1988

[54] FRONT DERAILLEUR FOR A BICYCLE

[75] Inventor: Masashi Nagano, Izumi, Japan

[73] Assignee: Shimano Industrial Company Limited, Osaka, Japan

[21] Appl. No.: 41,524

[22] Filed: Apr. 23, 1987

[30] Foreign Application Priority Data

Apr. 28, 1986 [JP] Japan ............................ 61-64938[U]

[51] Int. Cl.$^4$ .............................................. F16H 9/00
[52] U.S. Cl. ........................................ 474/78; 474/82
[58] Field of Search ..................................... 474/78–83, 474/140, 144

[56] References Cited

U.S. PATENT DOCUMENTS 4,543,078 9/1985 Cole ....................................... 474/82

FOREIGN PATENT DOCUMENTS 43-19064 8/1968 Japan .

Primary Examiner—Thuy M. Bui
Attorney, Agent, or Firm—Stevens, Davis, Miller & Mosher

[57] ABSTRACT

A front derailleur for a bicycle which includes a linkage mechanism which is formed of a fixing member, a chain guide and a pair of linkage members. Four pivot shafts connect the linkage members with the fixing member and the chain guide and have axes which are slanted forwardly from a perpendicular plane through a center line between the guide plates the fore ends of the pivot shafts are positioned farther than their rear ends from the chain guide. When the linkage mechanism is deformed, the chain guide is moved axially of the multistage front gears and obliguely longitudinally of the bicycle, thereby improving the speed change characteristics and speed control efficiency of the derailleur.

2 Claims, 1 Drawing Sheet

FRONT DERAILLEUR FOR A BICYCLE

FIELD OF THE INVENTION

The present invention relates to a front derailleur for a bicycle, and more particularly to a front derailleur provided with a linkage mechanism comprising a fixing member, a chain guide having an inner guide plate and an outer guide plate, and linkage members for supporting the chain guide to the fixing member through pivot shafts, so that the linkage mechanism is deformed to move the chain guide axially of the front gears of the bicycle.

BACKGROUND OF THE INVENTION

The abovedescribed type of front bicycle derailleur is disclosed in, for example, Japanese Utility Model Publication Gazette No. Sho 43-19,064. This publication discloses a derailleur in which two parallel linkage members are supported swingably through pivot shafts to a fixing member fixed to the bicycle frame, and a chain guide is pivotally supported to the utmost ends of the linkage members through pivot shafts parallel to the aforesaid pivot shafts to thereby form a linkage mechanism. The linkage mechanism is deformed to move the chain guide axially of multistage front gears, to shift thereby a driving chain from one to another of the front gears.

Generally, the pivot shafts are mounted lengthwise of the chain guide, that is, longitudinal of the bicycle. In the above described conventional derailleur, the axis of each pivot shaft is slanted at the longitudinally fore end downwardly with respect to the rear end.

Accordingly, in such construction, the chain guide, when the linkage mechanism is deformed, moves axially of the front gear and simultaneously longitudinally of the bicycle, in comparison with front derailleurs in which the pivot shafts are disposed horizontally, thereby reducing a contact resistance between the chain guide and the driving chain and enabling the bicycle speed to be changed with a light touch. The pivot shafts, which extend longitudinally of the bicycle and parallel to the chain guide, move in a circular arc with respect to the axial direction of the front chain gear.

In order to ensure the shifting of the chain to a desired one of the front gears, the amount of chain guide movement axially of the front chain gear and the amount of movement thereof longitudinally of the bicycle are determined with respect to a stroke required to operate a control wire, so that when the chain is shifted from a smaller diamater chain gear to a larger diameter one, the chain guide moves along a circular arc around the axis longitudinally of the bicycle, in other words, in a circular arc with respect to the axial direction of the front gear. This type of conventional front derailleur will create the following problem.

When the front derailleur is mounted on the bicycle frame, since the front gears are not constant in mounting position with respect to the bicycle frame, a ratio of the axial movement to the longitudinal movement of the chain guide varies greatly when the mounting position thereof changes.

Hence, for example, when the chain guide is mounted to ensure a predetermined axial movement, the amount of longitudinal movement is reduced sacrificing improving the speed control efficiency, and when mounted to ensure a predetermined amount of longitudinal movement to improve the speed control efficiency, the amount of axial movement is sacrificed so as to lower the speed control efficiency.

SUMMARY OF THE INVENTION

In light of the above problem, the present invention has been designed. An object thereof is to provide a front derailleur for a bicycle which can (1) move the chain guide forwardly following the movement of the driving chain, (2) ensure a predetermined amount of movement of the chain guide axially of the front gear so as to improve the speed change efficiency, and (3) ensure a predetermined amount of movement of the same longitudinally of the bicycle so as to improve the speed control efficiency.

The front derailleur for the bicycle of the invention is provided with a linkage mechanism comprising a fixing member, a chain guide having an inner guide plate and an outer guide plate, and linkage members for supporting the chain guide to the fixing member through pivot shafts so that the linkage mechanism is deformed to move the chain guide axially of the front gear. The axis of each pivot shaft, is oriented such that when the front derailleur is mounted, on the bicycle, it is slanted frontwardly in the longitudinal direction thereof from a perpendicular to the center line between the guide plates, and the fore end of the pivot shaft is positioned further from the chain guide than its rear end. An angle of inclination between the axis of the pivot shaft and the center line between the guide plates is set preferably within a range of about 30° to 60°.

In the abovedescribed construction, the chain guide, when the chain is shifted thereby, moves linearly and slantwise forwardly with respect to the axial direction of the front gear when viewed in plan, thereby moving the chain guide longitudinally of the bicycle to an extent of movement required to improve the speed control efficiency and also moving axially of the front gear to an extent of movement required to improve the same. The amounts of these movements can always be ensured even when the multistage front gears vary in the axially mounting position.

Accordingly, the bicycle speed change is always efficiently performed and the speed change efficiency of the chain guide is greatly improved.

The above and further objects and novel features of the invention will be more fully apparent from the following detailed description when read in connection with the accompanying drawings.

DETAILED DESCRIPTION OF THE INVENTION

Figure 3:
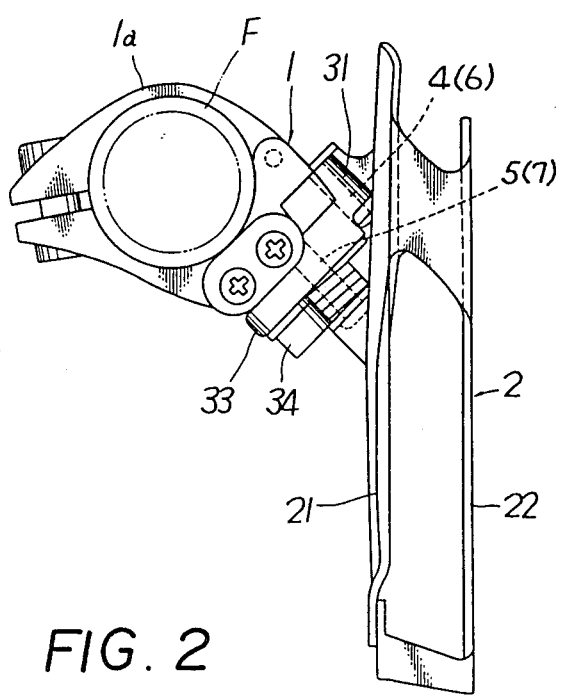
FIG. 3 is a plan view of the same.
Figure 2:
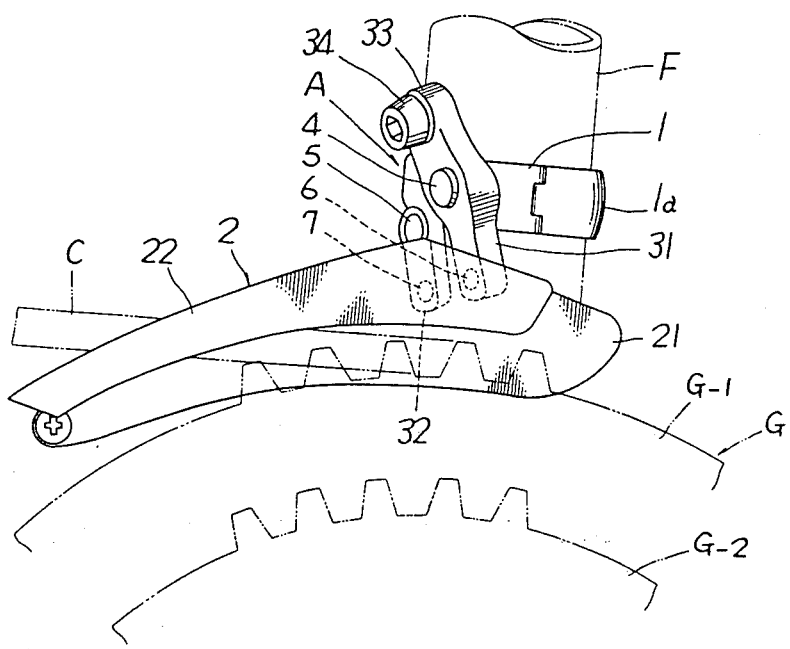
FIG. 2 is a side view of the front derailleur in FIG. 1.

Referring to FIGS. 2 and 3, a front derailleur is provided with a fixing member 1 fixed to a seat frame F of the bicycle through a mounting band 1a, a chain guide 2 having an inner guide plate 21 and an outer guide plate 22, and a pair of first and second linkage members 31 and 32. The linkage members 31 and 32 are connected to the fixing member 1 and chain guide 2 through pivot shafts 4 through 7 extending parallel to each other, thereby forming a linkage mechanism A with the fixing member 1, chain guide 2 and linkage members 31 and 32.

The first linkage member 31 is integrally provided with an operating arm 33 extending upwardly, and a control wire extending from a control lever (not shown) mounted on the bicycle frame is connected to a wire holder 34 provided at the operating arm 33. The control lever is operated to swing the operating arm 33 through the control wire so as to swing the linkage members 31 and 32, thereby moving the chain guide 2 axially of the multistage front gears G provided at the lower portion of the frame F and forwardly in the longitudinal direction of the bicycle as discussed below.

The multistage front gears G have at their axially outside position a larger diameter chain gear G-1 and at their axially inside position a smaller diameter chain gear G-2. Chain guide 2 moves to shift the chain to each chain gear G-1 or G-2 to thereby change the bicycle speed.

The pivot shafts 4 and 5 support the linkage members 31 and 32 at upper portions thereof to the fixing member 1. The other pivot shafts 6 and 7 support the linkage members 31 and 32 at lower portions thereof to pairs of support walls 23 and 24 extending from the inner guide plate 21, thereby swinging the linkage members 31 and 22 in parallel around the pivot shafts 4 through 7 respectively.

Figure 1:
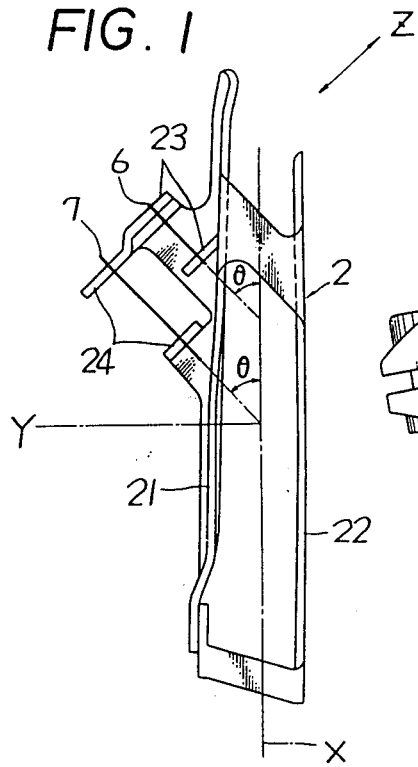
FIG. 1 is a plan view of an embodiment of a front derailleur for a bicycle of the invention, showing a principal portion thereof.

The preferred embodiment of the invention, as clearly shown in FIG. 1, has the axis of respective pivot shafts 4 through 7 slanted relative to a perpendicular direction Y with respect to center line X between the guide plates 21 and 22, pivot pins 4-7 are slanted forwardly in the longitudinal direction of the bicycle when the front derailleur is mounted on the bicycle. The fore ends of the pivot shafts are each disposed closer than rear ends thereof to chain guide 2. In particular, an angle of inclination between the axis of the respective pivot shafts 4 through 7 and the center line X is set at 30° to 60°.

Thus, when the chain guide 2 is moved axially of the multistage front gears G to shift the chain C between the larger diameter chain gear G-1 and the smaller diameter gear G-2, the chain guide 2 is movable linearly and at an oblique angle relative to the axis of the gear assembly forwardly of the front gears when viewed in plan, i.e., in the direction of arrow Z. Hence, the chain guide 2 can move axially of the front gears while being displaced obliquely longitudinally relative to the gear assembly axis.

Next, explanation will be given regarding the reason for slanting the pivot shafts 4 through 7 at a predetermined angle of 30° to 60° with respect to the center line X between the guide plates 21 and 22.

In order to ensure the shifting of chain C between the chain gears G-1 and G-2, it is required to move the chain guide 2 axially usually by a distance of 7 to 8 mm. Also, in order to smoothly shift the chain to each front gear G-1 or G-2 to thereby improve the speed change efficiency, it is required to move the chain guide longitudinally a minimum distance of 4 mm. Such requirements are satisfied by disposing the pivot shafts 4 through 7 in the range of 30° to 60°, whereby the chain C can reliably be shifted to each front gear G-1 or G-2 and the speed control efficiency can be improved.

In a case where the angle $\theta$ of inclination of the respective pivot shafts 4 through 7 is 30° or less, an amount of longitudinal movement of the chain guide 2 becomes smaller than the aforesaid minimum value of 4 mm with respect to an operating stroke of the control wire connected to the chain guide, thereby not completing the purpose of raising the speed change characteristic. In a case where the angle $\theta$ of inclination is 60° or more, the amount of longitudinal movement of the chain guide 2 becomes larger than necessary, with respect to the operating stroke of the same. Accordingly, the amount of axial movement of the chain guide 2 becomes smaller than the necessary stroke of 7 mm, whereby it is required to increase the operating stroke of the wire in order to ensure the necessary stroke, creating a new problem in that the speed change characteristic is deteriorated.

The angle of inclination of the respective pivot shafts 4 through 7 is preferably set at 45°, in which an amount of movement of the chain guide 2 longitudinally of the bicycle is 8 mm and the movement axially of the front gear is 8 mm, thereby enabling the speed change by the chain guide in an optimum condition.

The chain guide 2, when the chain is shifted thereby, can move linearly and slantwise forwardly when viewed in plan with respect to the axial direction of the front chain gear by slanting the pivot shafts 4 through 7 as described above. In other words, the chain guide 2 moves linearly in the direction of the arrow Z in FIG. 1, but not in a circular arc around the longitudinal axis as is conventional. Hence, a contact resistance between the chain guide 2 and the chain C can always be reduced even when the multistage front chain gears vary in their mounting position, thereby improving the speed change characteristics and reducing an operating force required for changing the bicycle speed.

Furthermore, since the chain C, when shifted from the smaller diameter chain gear G-2 to the larger diameter gear G-1, is biased by the chain guide 2 slantwise forwardly with respect to the center line X between the guide plates, there is no need to provide at the front edge of the outer guide plate 22 a restraint to prevent the chain as it is being shifted from projecting axially outwardly of the larger diameter chain gear G-1. In other words, the front edge of the outer guide plate 22 moves axially of the front chain gear and forwardly of the bicycle so as to restrain the chain C from projecting outwardly as described above, thereby enabling the outer guide plate 22 to be reduced in length.

Thus, the chain guide 2 can be short in length without allowing chain C to escape therefrom, thereby reducing the contact resistance with the chain C and improving the speed control efficiency.

The chain guide 2, when the chain C is shifted thereby from the larger diameter chain gear G-1 to the smaller diameter gear G-2, moves slantwise rearwardly with respect to the aforesaid center line X so that the position where the outer guide plate 22 pushes the chain C toward the smaller diameter chain gear G-2 is displaced rearwardly to deflect the chain easily in comparison with the conventional front derailleur having the pivot shafts 4 through 7 parallel to the center line X. Hence, the chain C can be moved by a small force axially inwardly of the multistage front gears with an improved speed control efficiency. Also, the chain guide 2 can move downwardly at the rear edge, thereby corresponding to a large gear capacity to that extent.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. A front derailleur for a bicycle, said derailleur comprising:
   (a) a linkage mechanism comprising a fixing member, a chain guide having an inner guide plate and an outer guide plate, and linkage members supporting said chain guide to said fixing member, said linkage members being oriented substantially vertically when said derailleur is mounted on said bicycle; and
   (b) pivot shafts for pivotally supporting said linkage members to said fixing member and said chain guide, each of said pivot shafts having a longitudinal axis which is (i) oriented within respective horizontal planes substantially normal to said central vertical plane of said bicycle and (ii) slanted forwardly relative to a longitudinal direction of the bicycle when said front derailleur is mounted on said bicycle, with each of said pivot shafts having a fore end which is positioned closer to said fixing member than to said chain guide and a rear end which is positioned closer to said chain guide than to said fixing member, said chain guide, responsive to actuation of said derailleur, moving substantially within a vertical plane oriented substantially perpendicular to a horizontal plane normal to said central vertical plane of said bicycle in a direction oblique with respect to an axis of a front gear assembly of said bicycle forwardly of said bicycle from a rest position of said derailleur.

2. A front derailleur for a bicycle according to claim 1, wherein an angle of inclination between the axis of each of said pivot shafts and a center line between said guide plates is between about 30° to 60°.

* * * * *